J. R. & J. E. GLENN.
FOLDING HAY RAKE.
APPLICATION FILED MAY 20, 1913.

1,118,901.

Patented Nov. 24, 1914.
3 SHEETS—SHEET 1.

WITNESSES:

INVENTORS
J. R. Glenn
J. E. Glenn
BY
ATTORNEY

J. R. & J. E. GLENN.
FOLDING HAY RAKE.
APPLICATION FILED MAY 20, 1913.

1,118,901.

Patented Nov. 24, 1914.

3 SHEETS—SHEET 3.

WITNESSES:

INVENTORS
J. R. Glenn
J. E. Glenn
BY
John M. Spellman
ATTORNEY

UNITED STATES PATENT OFFICE.

JAMES R. GLENN AND JESSE E. GLENN, OF SANTO, TEXAS.

FOLDING HAY-RAKE.

1,118,901.  Specification of Letters Patent.  Patented Nov. 24, 1914.

Application filed May 20, 1913. Serial No. 768,719.

*To all whom it may concern:*

Be it known that we, JAMES R. GLENN and JESSE E. GLENN, citizens of the United States, residing at Santo, in the county of Palo Pinto and State of Texas, have invented certain new and useful Improvements in Folding Hay-Rakes, of which the following is a specification.

Our invention relates to a new and useful hay rake, and its object is to provide a hay rake that may have its working width considerably reduced when the machine is being conveyed to or from a field, so that the rake may be adapted to travel along narrow lanes or through gates.

A further object of our invention is to provide a mechanism for raising the rake teeth and for holding the same adjusted in a raised position, and to furthermore provide for preventing a quantity of hay gathered by the rake from being raised as the teeth are elevated.

Finally the object of our invention is to provide a device of the character described, that will be strong, durable, simple and efficient and comparatively easy to construct, and also one the various parts of which will not be likely to get out of working order.

Figure 1:
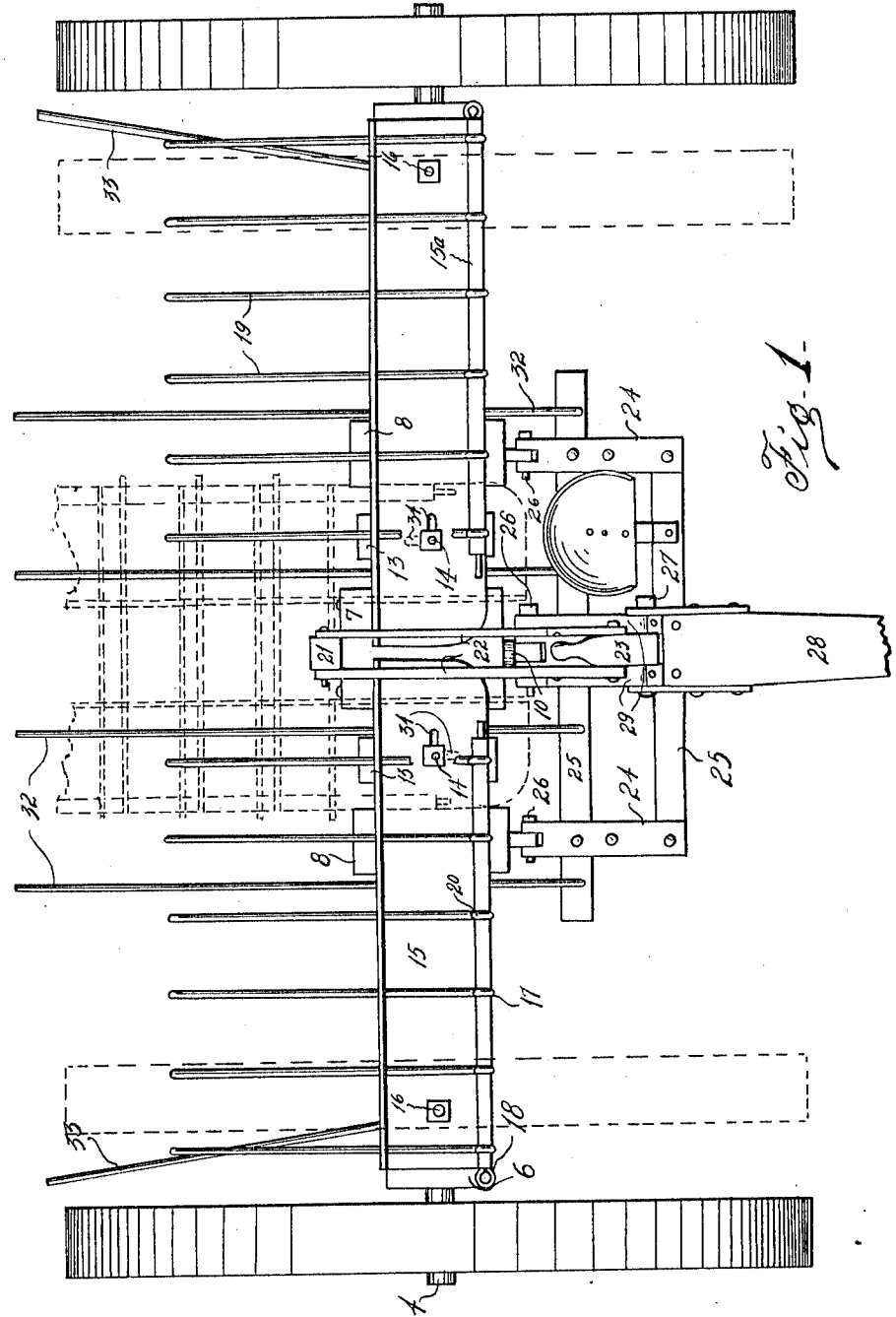
Figure 2:
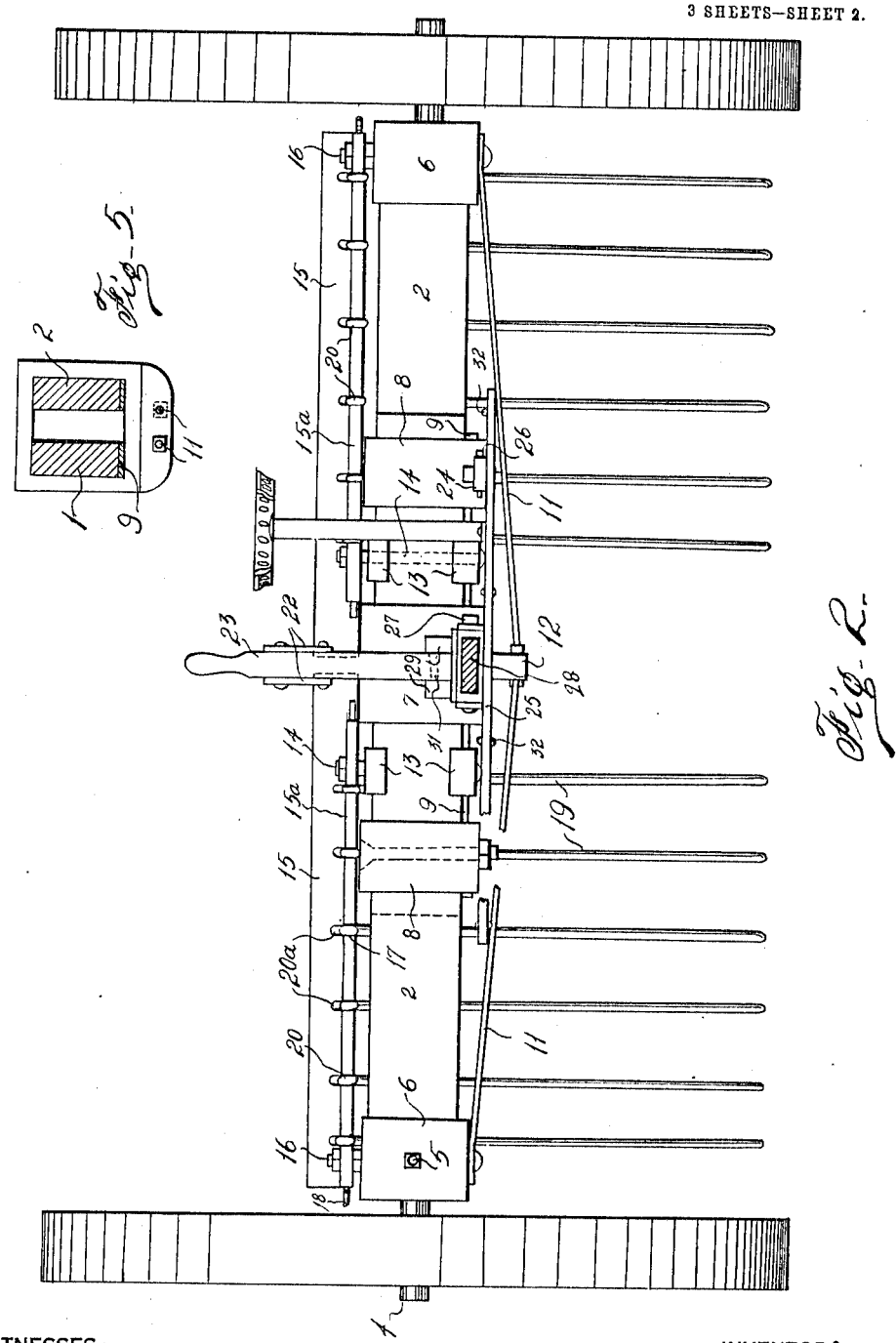
Figure 3:
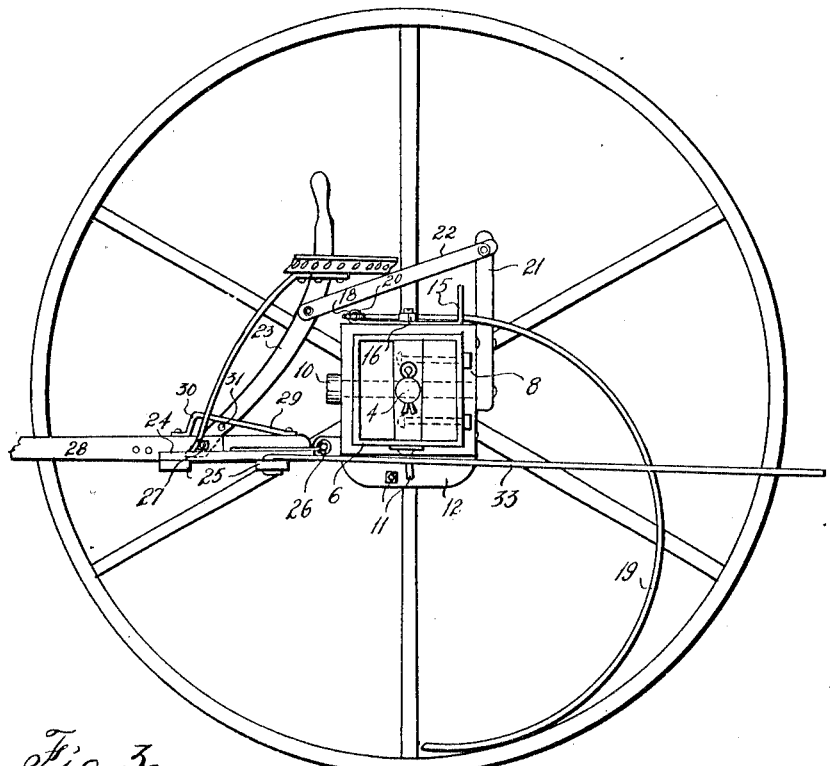
Figure 4:
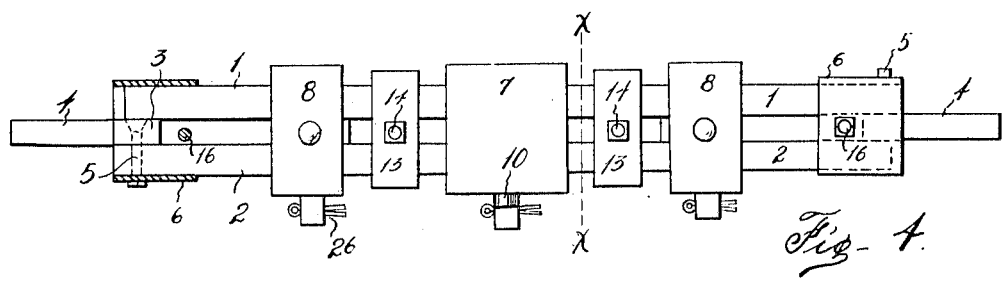
Figure 6:
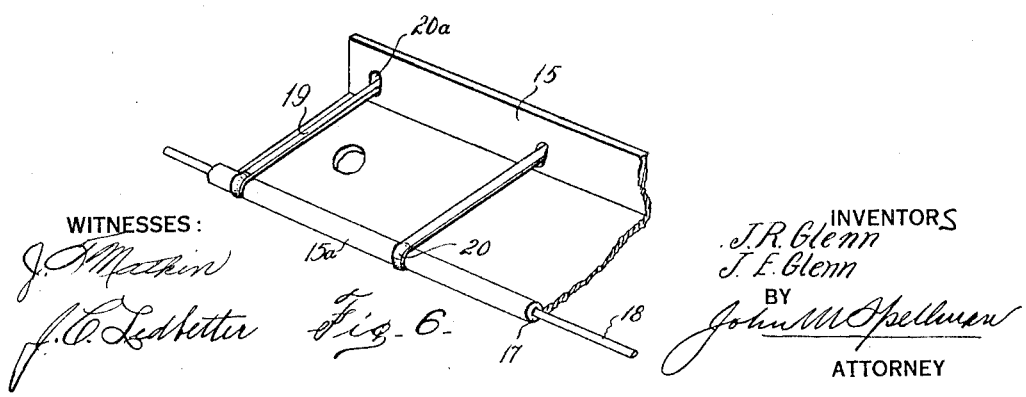

With these and various other objects in view, our invention has relation to certain novel features of the construction and operation, an example of which is described in the following specification, and illustrated in the accompanying drawings, wherein:

Figure 1 is a plan view of our improved rake, showing the same adjusted in its working position, this view also showing in dashed lines the position occupied by the rake teeth when the width of the machine has been reduced to a minimum. Fig. 2 is a view of our invention in front elevation. Fig. 3 is a view of the same in side elevation, the transporting wheel nearest the eye being omitted from the view. Fig. 4 is a top view of the axle of our rake adjusted in its position of least length. Fig. 5 is a transverse sectional view of the axle, the section being taken upon the line X—X of Fig. 4. Fig. 6 is a detailed perspective view showing an end portion of a rake member embodied in our machine. Fig. 7 is a side elevation similar to Fig. 3, but showing the rakes folded.

Referring now more particularly to the drawing, wherein like reference characters designate similar parts in all the figures, the numerals 1 and 2 respectively designate two members together comprising an extensible axle, each of said members having bolted to its outer extremity a plate 3 carrying an integral axle spindle 4, whereby one spindle is attached to the member 1 and the other spindle is attached to the member 2 and when the axle is adjusted the members slide relative to each other. The spindles 4 are in alinement with each other, and being interposed between the two axle members, serve to hold said members in a certain desired spaced relation. The bolts 5 two of which hold each of the plates 3 in a rigid relation to the correlated axle member, serve also to hold a rectangular metallic keeper 6 in a fixed relation with the same member, the other axle member being freely slidable in said keeper. The inner ends of the axle members 1 and 2 do not however enter the keeper 6 except when the length of the axle is adjusted to a minimum. The overlapping portions of the axle are furthermore held in their proper relations by a keeper 7 disposed at the center of the axle, and a pair of keepers 8 equidistantly spaced at each side of the keeper 7, the three keepers 7 and 8 being held in their proper spaced relation by a metal strip 9 contiguous with the under side of the axle and rigidly secured to the said three keepers.

When the axle has been extended to its working length, the two members are restricted against relative sliding displacement by passing a pin 10 through the center keeper 7 and through said members. The extensible axle is reinforced by two metal truss rods 11 each having its outer extremity secured to the under side of the keeper 6, the inner end of the rods being passed through a depending rib 12 transversely formed upon the under side of the central keeper 7.

Between the keeper 7 and each keeper 8, the axle is engaged by a pair of clamping members 13, respectively abutting against the top and bottom of the axle, said members being adapted to be clamped against the axle by a bolt 14 passing between the two axle members. Upon each bolt 14 is mounted the inner extremity of an angular plate 15, the outer extremity of said plate being mounted upon a bolt 16, one of which is mounted fast in a vertical position in the other end of each axle member. In their working positions, the two plates 15 extend parallel to and just above the axle in opposite directions from the center thereof. The rear edge portion of each plate 15 is turned upwardly at a right angle, and the forward edge portion of each plate, is bent into tubular form as indicated at 15ª, a number of transverse slits 17 being formed at intervals in the member 16. Through the tubular member 15ª, there is passed an elongated rod 18, upon which rod are mounted the upper ends of rake teeth 19, said teeth have eyes 20 formed upon their upper ends and projecting into the slits 17 so that the rods 18 may pass through said eye. The rake teeth extend rearwardly from the rod 18 passing through vertical slots 20ª formed in the upstanding portion of the plate 15, the teeth thus being restricted against displacement to or from each other. The rake teeth 19 will have the usual semi-circular form terminating adjacent to the surface of the ground. By mounting the rake teeth upon the plate 15 in the manner just described, it is made possible to very quickly and easily remove said teeth by withdrawing the rod 18 from the keeper 15ª.

To the rear face of the member 7 there is secured an upright arm 21, which arm is connected by swinging bars 22 with a lever 23. The manner of pivotally supporting the lower end of said lever and holding the lever adjusted in a certain position will presently be described.

Just in front of the axle, there is mounted a swinging frame comprising three bars 24 normally parallel with the direction of travel of the machine, and two bars 25 parallel with the axle. The bars 24 project rearwardly slightly beyond the rearmost bar 25 and are pivotally connected with the member 7 and the members 8 respectively as indicated at 26. The same bolt 27 that serves to secure the rear end of the tongue 28 to the center member 24, will preferably serve also as a pivotal support for the lower end of the lever 23. Upon the center bar 24 at each side of the lever 23, there are mounted two curved metal plates 29 which serve to guide the lower end of the lever during its angular displacement restricting it against any tendency toward lateral movement. The forward ends of the two bars 29 are turned down at a right angle as indicated at 30, and when the lever has been swung to its forward limiting position producing a rotation of the axle such as will elevate the rake teeth, the lever may be held in such position by inserting a pin in the hole 31 adjacent to the lower end of the lever 23, said pin being caused to abut against the downward turned portion of the plate 30 and thus preventing rearward displacement of the lever. To the rearmost bar 25, there are secured a plurality of horizontal teeth 32 projecting rearwardly beneath the axle. When the implement through its travel has gathered a considerable quantity of hay, the operator will throw the lever 23 forward thereby raising the rake teeth. The hay will have a tendency to adhere between the rake teeth and thereby rise with said teeth, and this tendency is counteracted by the teeth 32 which projecting into the pile of hay hold it against upward displacement. At each end of the axle, a bar 33 projects rearwardly, said bars occupying positions just outside of the rake when the latter is in its working position. The purpose of the bars 33 is to prevent the outermost rake teeth from being spread outward sufficiently to be caught in the spokes of the said supporting wheels, a tendency to spread laterally being impressed upon the rake teeth by the hay bearing against the same.

When the operator wishes to decrease the width of his hay rake, the outer ends of the plates 15 are first freed from the bolts 16, leaving said plates free to swing toward each other in a rearward direction about the bolts 14 as pivots. The teeth of the two rake members will contact with each other before the plates 15 reach a parallel relation, and in order to prevent the teeth interlocking it will usually be necessary to remove several of the teeth nearest adjacent to the bolts 14. When this has been done, there will usually be no difficulty in bringing the teeth of one rake member between those of another so that the two bars 15 may extend rearwardly in a parallel relation. The fact that the rake teeth are free to undergo a slight vertical displacement within the slots 20 will facilitate the adjustment of the teeth of one rake member between those of another. As a further means to facilitate accomplishing this object, the apertures in the plate 15 receiving the bolts 14 are slotted as indicated at 34, thus making it possible for the plate to be adjusted longitudinally to a slight degree if necessary to cause the teeth of one rake member to alternate with those of the other when being adjusted toward each other. To bring the wheels closer together and reduce the length of the axle the pin 10 is removed whereby the overlapping ends of the members 1 and 2 are free to be slid inward and past each other, whereby the spindles 4 which carry the wheels are brought toward each other. It is to be understood that the wheels are manually forced together.

The invention is presented as including all such modifications and changes as properly come within the scope of the following claims.

What we claim is:

1. In a hay rake, an extensible axle, a pair of ground wheels in which the axle is mounted, a pair of rake members pivoted on the axle and adapted to swing rearwardly, said axle being adjustable in length.

2. In a hay rake, a pair of ground wheels, a telescoping axle mounted in the ground wheels, a pair of oppositely directed rake members pivoted on the axle to fold together, said axle being constructed to be reduced in length, after the members are folded together.

3. In a hay rake, an extensible axle, a pair of ground wheels supporting the axle, a pair of rake members, one pivoted on each side of the center of the axle, said members being arranged to swing rearward, means for rocking the axle to raise the teeth of the rake members, and means for holding the rake teeth in an elevated position.

4. In a hay rake, a pair of ground wheels, an extensible axle mounted in the wheels, a pair of rake members, each having its inner end pivoted to the axle near the center of the latter, means for fastening the rake members parallel with the axle, said members being arranged to fold together, means for elevating the rake teeth, and means for locking the axle in its extended position.

5. In a hay rake, a pair of ground wheels, an extensible axle mounted in the wheels, a pair of rake members, each having pivotal connection at its inner end with the axle, said members being foldable, means for locking the rake members in their extended position, means for elevating the rake members, rearwardly extending load engaging fingers passing through the rake members.

In testimony whereof we have signed our names to this specification in the presence of two subscribing witnesses.

JAMES R. GLENN.
JESSE E. GLENN.

Witnesses:
ALBERT BRANNON,
JNO. D. DYER.

Copies of this patent may be obtained for five cents each, by addressing the "Commissioner of Patents, Washington, D. C."